US009103663B2

(12) United States Patent
Min et al.

(10) Patent No.: US 9,103,663 B2
(45) Date of Patent: Aug. 11, 2015

(54) DEPTH SENSOR, METHOD OF CALCULATING DEPTH IN THE SAME

(75) Inventors: Dong Ki Min, Seoul (KR); Young Gu Jin, Osan-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 383 days.

(21) Appl. No.: 13/617,752

(22) Filed: Sep. 14, 2012

(65) Prior Publication Data

US 2013/0169756 A1     Jul. 4, 2013

(30) Foreign Application Priority Data

Dec. 29, 2011  (KR) .......................... 10-2011-0146497

(51) Int. Cl.
| | |
|---|---|
| *G01B 11/22* | (2006.01) |
| *H04N 13/00* | (2006.01) |
| *H04N 13/02* | (2006.01) |
| *G01B 11/02* | (2006.01) |
| *G01S 17/10* | (2006.01) |
| *G01S 7/486* | (2006.01) |
| *G01S 17/89* | (2006.01) |

(52) U.S. Cl.
CPC .............. *G01B 11/22* (2013.01); *G01B 11/026* (2013.01); *G01S 7/4865* (2013.01); *G01S 17/10* (2013.01); *H04N 13/0022* (2013.01); *H04N 13/0271* (2013.01); *G01S 17/89* (2013.01); *H04N 2013/0081* (2013.01)

(58) Field of Classification Search
CPC ...... G01B 11/162; G01B 11/14; G01B 11/22; G01B 11/26; G01B 11/0608; H04N 13/02

USPC .................................. 348/135; 356/213, 215
See application file for complete search history.

(56) References Cited

U.S. PATENT DOCUMENTS

| | | | |
|---|---|---|---|
| 6,035,717 A | 3/2000 | Carodiskey | |
| 7,362,419 B2 * | 4/2008 | Kurihara et al. | ............. 356/4.07 |

FOREIGN PATENT DOCUMENTS

| | | |
|---|---|---|
| JP | 11325868 A | 11/1999 |
| KR | 20090040699 A | 4/2009 |
| KR | 100920931 B1 | 10/2009 |
| KR | 20100125622 A | 12/2010 |

OTHER PUBLICATIONS

Matteo Perenzoni and David Stoppa, "Figures of Merit for Indirect Time-of-Flight 3D Cameras: Definition and Experimental Evaluation",2011, Remote Sensing ISSN 2072-4292, p. 2461-2472.*

* cited by examiner

*Primary Examiner* — Sath V Perungavoor
*Assistant Examiner* — Clifford Hilaire
(74) *Attorney, Agent, or Firm* — Harness, Dickey & Pierce, P.L.C.

(57) ABSTRACT

A depth calculation method of a depth sensor includes outputting a modulated light to a target object, detecting four pixel signals from a depth pixel based on a reflected light reflected by the target object, determining whether each of the four pixel signals is saturated based on results of comparing a magnitude of each of the four pixel signals with a threshold value, and calculating depth to the target object based on the determination result.

18 Claims, 13 Drawing Sheets

DEPTH SENSOR, METHOD OF CALCULATING DEPTH IN THE SAME

CROSS-REFERENCE TO RELATED APPLICATIONS

This application claims priority under 35 U.S.C. §119(a) to Korean Patent Application No. 10-2011-0146497 filed on Dec. 29, 2011, the entire contents of which are hereby incorporated by reference.

BACKGROUND

Embodiments of the present inventive concepts relate to a depth sensor using a time of flight (TOF) principle, and more particularly, to the depth sensor for calculating depth and a depth calculation method thereof.

A sensor is an element that detects a state or a location of an object, converts a detection result into an electrical signal and delivers the electrical signal to a processor for analysis. The sensor has several types such as a light sensor, a temperature sensor, a pressure sensor, a magnetic sensor and a depth (or distance) sensor.

A signal output from a source of the depth sensor mainly uses a micro-wave, a light wave or an ultrasonic wave.

The depth sensor determines depth by using a time-of-flight (TOF) estimation method. That is, the depth sensor calculates depth or distance between the depth sensor and the target object by estimating a delay time needed for a signal in the form of a pulse, which is emitted from a source, to be reflected by a target object (or a measurement object) back to a plurality of pixels in the depth sensor, where each pixel outputs a pixel signal having a value according to the amount of reflected light. However, when a pixel receives too much light it may become saturated, if the value of the pixel signal exceeds a maximum threshold value of an analog to-digital converter. If saturation occurs, all that is known is that the value of the individual pixel exceeded the maximum value of the A/D converter. The actual value of the pixel is lost.

SUMMARY

An example embodiment is directed to a method of calculating depth of a depth sensor, including outputting a modulated light to a target object, detecting four pixel signals ($A_0$, $A_1$, $A_2$, $A_3$) from a depth pixel based on a reflected light reflected by the target object, determining whether each of the four pixel signals is saturated based on a magnitude of each of the four pixel signals ($A_0$, $A_1$, $A_2$, $A_3$) and a threshold value of the magnitude and calculating a depth to the target object based on the determination results.

The calculating depth uses at least one non-saturated pixel signal among the four pixel signals.

The calculating depth (Z) is calculated according to $Z=(aX+bY)/M$, each of the X and Y is a signal related to at least two of the four pixel signals, the M has a different value in a region defined according to a normalized delay ND, and the normalized delay ND indicates a phase shift of the modulated light and the reflected light is normalized to range from 0 to 1. The a, b, X, Y and M are real numbers.

The $X=A_0-A_2$ and the $Y=A_1-A_3$. The M is $(A_0-A_3+A_1-A_2)/2$ when the normalized delay ND is greater than or equal to 0 and less than 0.25 ($0 \le ND < 0.25$), and is $(A_1-A_0+A_2-A_3)/2$ when the normalized delay ND is greater than or equal to 0.25 and less than 0.5. The M is $(A_2-A_1+A_3-A_0)/2$ when the normalized delay ND is greater than or equal to 0.5 and less than 0.75 ($0.5 \le ND < 0.75$), and is $(A_3-A_2+A_0-A_1)/2$ when the normalized delay ND is greater than or equal to 0.75 and less than 1 ($0.75 \le ND < 1$).

When $A_0$ is a saturated pixel signal, the $X=-2A_2+A_1+A_3$, the $Y=A_1-A_3$, and the M is $A_1-A_2$ when the normalized delay ND is greater than or equal to 0 and less than 0.25 and the M is $A3-A2$ when the normalized delay ND is greater than or equal to 0.75 and less than 1.

When $A_1$ is a saturated pixel signal, the $X=A_0-A_2$, the $Y=-2A_3+A_0+A_2$, and the M is $A_0-A_3$ when the normalized delay ND is greater than or equal to 0 and less than 0.25 and the M is $A_2-A_3$ when the normalized delay ND is greater than or equal to 0.25 and less than 0.5.

When $A_2$ is a saturated pixel signal, the $X=2A_0-A_1-A_3$, the $Y=A_1-A_3$, and the M is $A_1-A_0$ when the normalized delay ND is greater than or equal to 0.25 and less than 0.5 and the M is $A_3-A_0$ when the normalized delay ND is greater than or equal to 0.5 and less than 0.75.

When $A_3$ is a saturated pixel signal, the $X=A_0-A_2$, the $Y=2A_1-A_0-A_2$, and the M is $A_2-A1$ when the normalized delay ND is greater than or equal to 0.5 and less than 0.75 and is $A_0-A_1$ when the normalized delay ND is greater than or equal to 0.75 and less than 1.

The calculating depth (Z), when two of the four pixel signals ($A_0$, $A_1$, $A_2$, $A_3$) are saturated, further includes estimating an ambient light signal (Best) emitted from an ambient light source by using a plurality of neighboring pixel signals ($A_{00}A_{10}A_{20}A_{30}$) detected from a neighboring depth pixel.

When $A_0$ and $A_1$ are saturated pixel signals, the $M=A_2+A_3-2Best$, the $X=A_3-A_2+M$, and the $Y=A_2-A_3+M$. When $A_1$ and $A_2$ are saturated pixel signals, the $M=A_0+A_3-2Best$. The $X=A_0-A_3-M$, and the $Y=-A_0+A_1-M$. When $A_2$ and $A_3$ are saturated pixel signals, the $M=A_0+A_1-2Best$, the $X=-A_1+A_0-M$, and the $Y=-A_0+A_1-M$. When $A_3$ and $A_0$ are saturated pixel signals, the $M=A_1+A_2-2Best$, the $X=-A_2+A_1+M$, and the $Y=A_1-A_2-M$.

An example embodiment of the present inventive concepts is directed to a depth sensor, including a light source outputting a modulated light to a target object, a depth pixel detecting four pixel signals based on a reflected light reflected by the target object, and a microprocessor determining whether each of the four pixel signals is saturated based on a magnitude of each of the four pixel signals and a threshold value of the magnitude and calculating a depth to the target object based on the determination results.

The microprocessor calculates the depth by using at least one non-saturated pixel signal among the four pixel signals.

An example embodiment is directed to a method of calculating distance using a depth sensor having at least one depth pixel, each depth pixel configured to generate a plurality of pixel signals corresponding to an amount of accumulated light and output a corresponding one of the plurality of pixel signals based on a corresponding photo gate control signal. The method including determining if any of the pixel signals are saturated, and calculating a distance to the target object using only the non-saturated pixel signals.

An example embodiment is directed to a method of calculating distance using a depth sensor having at least one depth pixel, each depth pixel configured to generate a plurality of pixel signals corresponding to an amount of accumulated light and output a corresponding one of the plurality of pixel signals based on a corresponding photo gate control signal. The method including determining if any of the pixel signals are saturated, and calculating a distance to the target object without using any of the pixel signals that are determined to be saturated.

BRIEF DESCRIPTION OF THE DRAWINGS

The above and other features and advantages will become more apparent by describing in detail example embodiments thereof with reference to the attached drawings in which.

DETAILED DESCRIPTION

Figure 1:
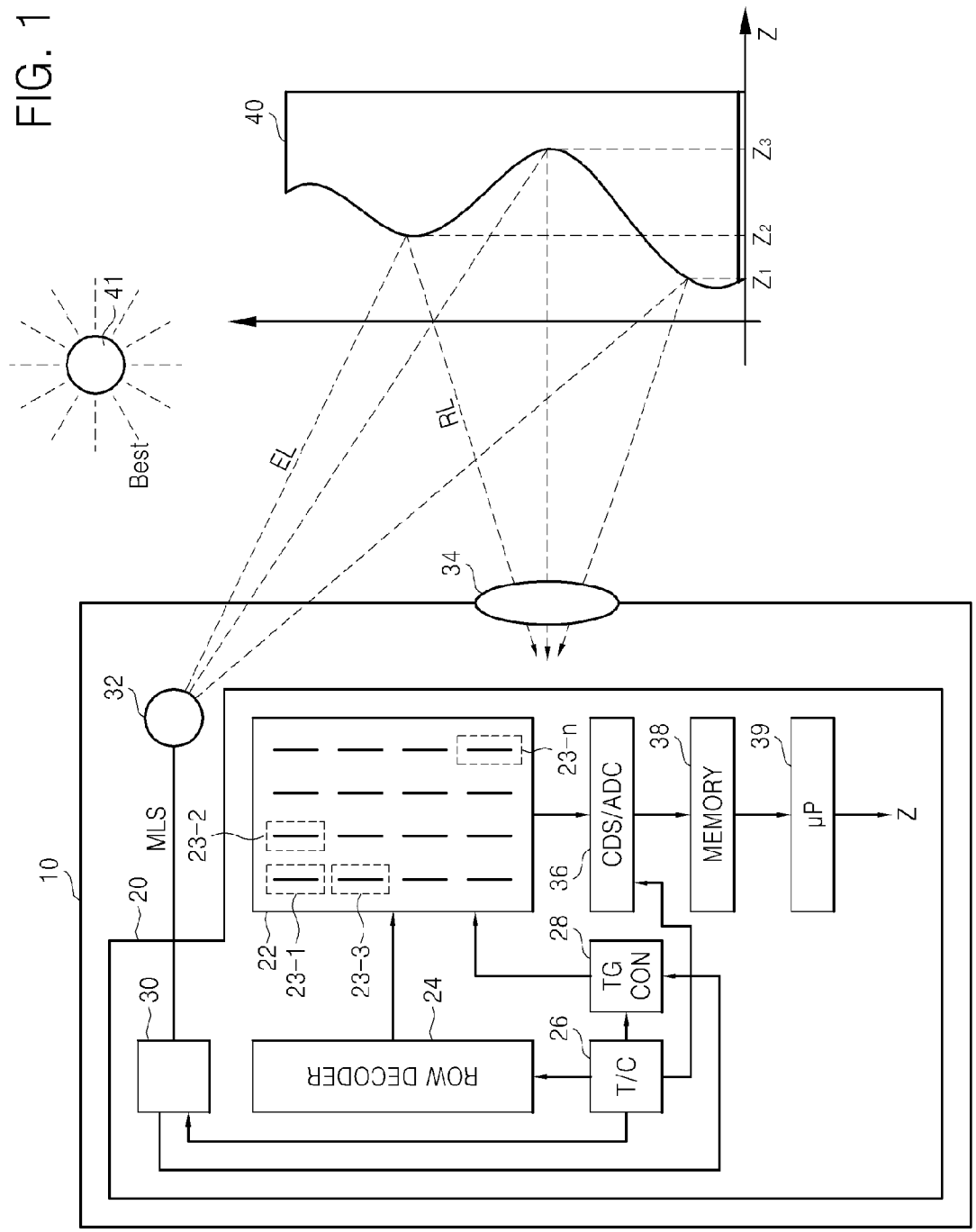
FIG. 1 is a block diagram of a depth sensor according to an example embodiment of the present inventive concepts.

Example embodiments now will be described more fully hereinafter with reference to the accompanying drawings, in which example embodiments are shown. Example embodiments may, however, be embodied in many different forms and should not be construed as limited to example embodiments set forth herein. Rather, example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
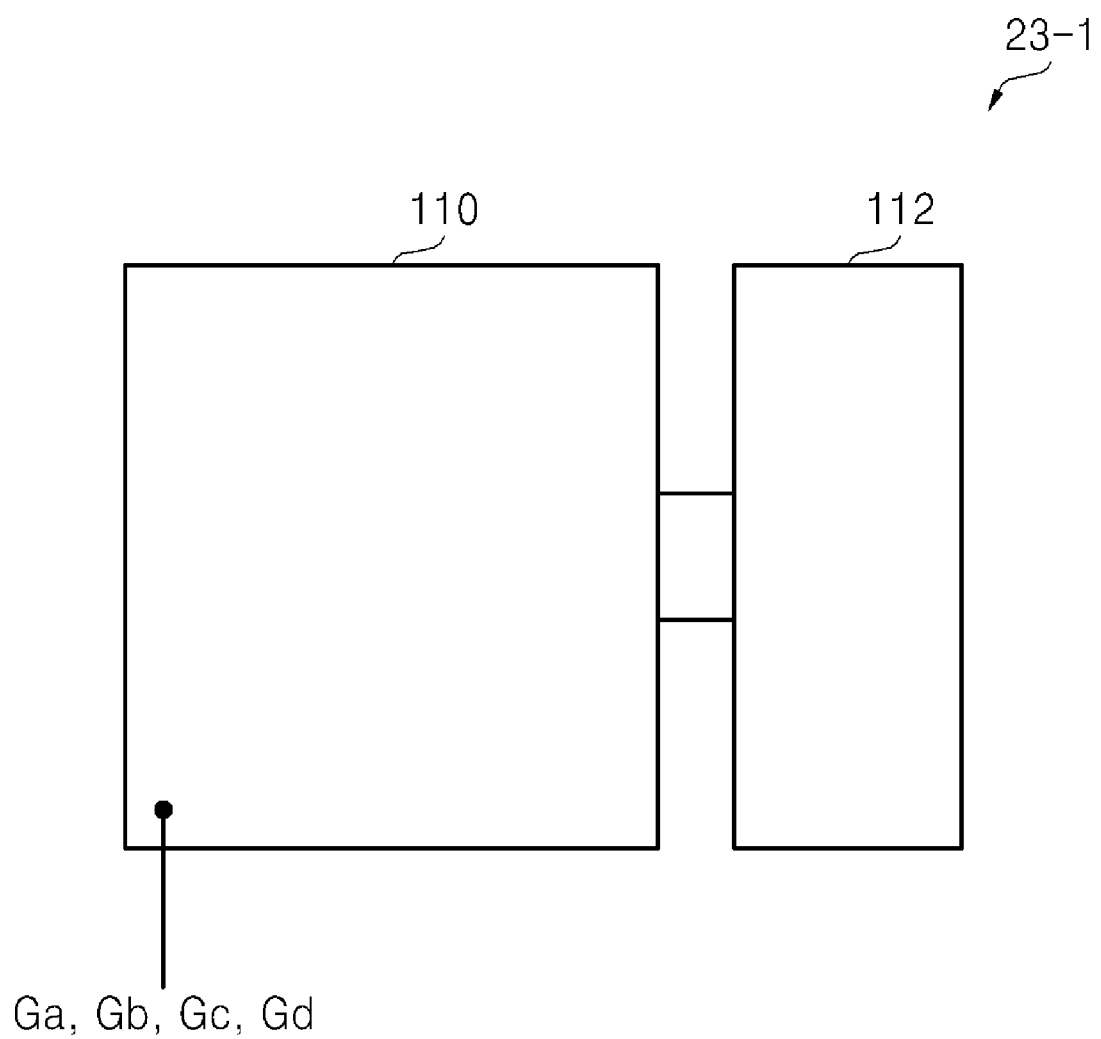
FIG. 2 is a plane diagram of the depth pixel illustrated in an array of FIG. 1.
Figure 3:
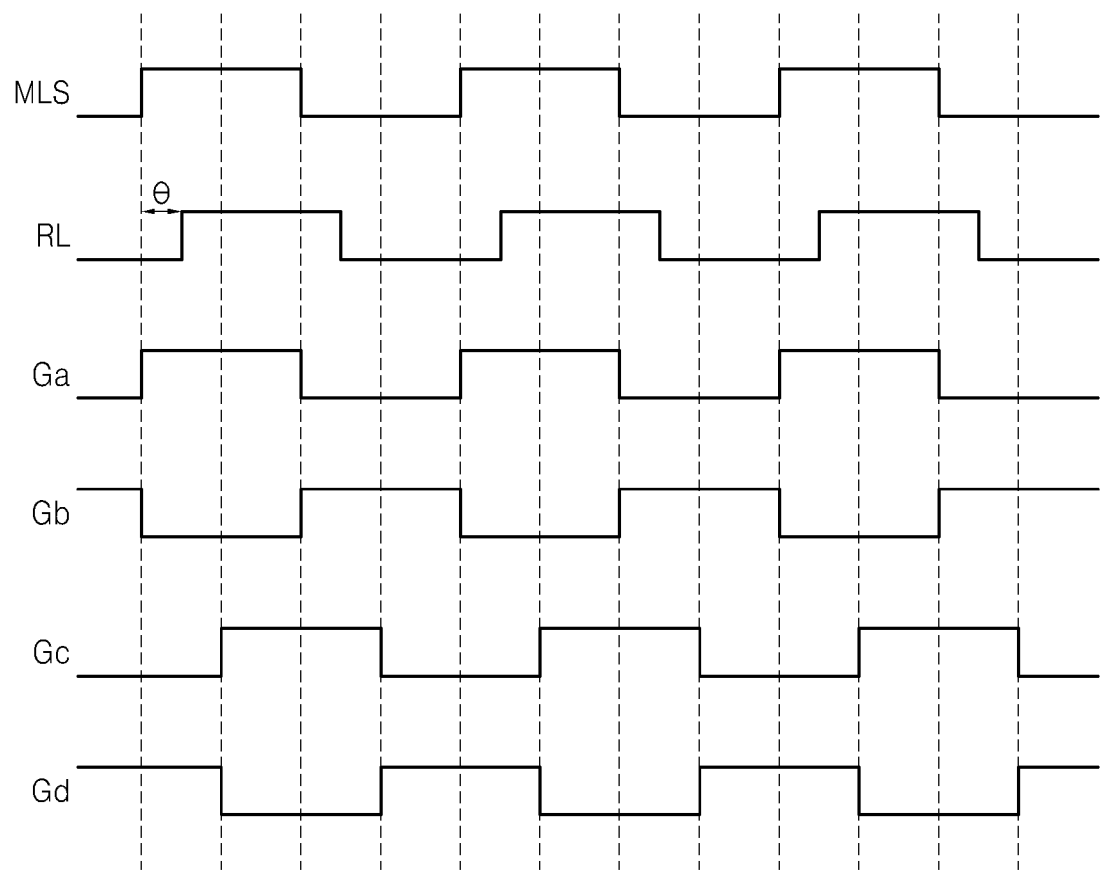
FIG. 3 is a timing diagram of photo-gate control signals for controlling a photo-gate included in the depth pixel illustrated in FIG. 1.

FIG. 1 is a block diagram of a depth sensor according to an example embodiment of the present inventive concepts, FIG. 2 is a plane diagram of a depth pixel illustrated in an array of FIG. 1, and FIG. 3 is a timing diagram of a plurality of photo-gate control signals for controlling a photo gate included in the depth pixel illustrated in FIG. 1.

Referring to FIGS. 1 to 3, a depth sensor 10 which may calculate depth by using a time of flight (TOF) principle includes an integrated circuit 20 including an array 22 where a plurality of depth pixels (detector or sensor: 23-1 to 23-$n$; n is a natural number) are arranged, a light source 32 and a lens module 34.

Each of the plurality of depth pixels 23-1 to 23-$n$ indicates a one-tap depth pixel for convenience of explanation; however, example embodiments are not restricted to a one-tap depth pixel. That is, the array 22 may include a plurality of two-tap depth pixels instead of a plurality of one-tap depth pixels according to an example embodiment.

A depth pixel 23-1 two-dimensionally embodied in the array 22 includes a photo gate 110. The depth pixel 23-1 also includes a transistor 112 for processing a signal.

A row decoder 24 selects one of a plurality of rows in response to a row address output from a timing controller 26. Here, a row means a set of a plurality of one-tap depth pixels arranged in a X-direction.

A photo gate controller 28 may generate a plurality of photo gate control signals Ga, Gb, Gc and Gd and supply them to the array 22 under a control of a timing controller 26.

As illustrated in FIG. 3, each photo gate control signal Ga, Gb, Gc and Gd is a square wave.

A phase difference between the first photo gate control signal Ga and a third photo gate control signal Gc is 90°, a phase difference between the first photo gate control signal Ga and a second photo gate control signal Gb is 180°, and a phase difference between the first photo gate control signal Ga and a fourth photo gate control signal Gd is 270°.

A light source driver 30 may generate a clock signal MLS which may drive a light source 32 under a control of the timing controller 26. The light source 32 emits a modulated optical signal EL to a target object 40 in response to the clock signal MLS. A light emitting diode (LED) or a laser diode may be used as the light source 32. A modulated light signal EL and the clock signal MLS have an identical phase.

According to an example embodiment, the modulated optical signal EL may be a square wave. According to another example embodiment, the modulated optical signal EL may be a sine wave.

The light source driver 30 supplies the clock signal MLS or information on the clock signal MLS to the photo gate controller 28. Subsequently, the photo gate controller 28 generates a first photo gate control signal Ga having the same phase as the clock signal MLS and a second photo gate control signal Gb having a phase difference of 180° from the clock signal MLS under a control of the timing controller 26. In addition, the photo gate controller 28 generates a third photo gate control signal Gc having a phase difference of 90° from the clock signal MLS and a fourth photo gate control signal Gd having a phase difference of 270° from the clock signal MLS.

The photo gate controller 28 may supply the first photo gate control signal Ga, the second photo gate control signal Gb, the third photo gate control signal Gc and the fourth photo control signal Gd sequentially to the array 22 under a control of the timing controller 26.

According to an example embodiment, when each of a plurality of depth pixels 23-1 to 23-n is a two-tap depth pixel, the photo gate controller 28 may supply the first photo gate control signal Ga and the third photo gate control signal Gc simultaneously to the array 22, and supply the second photo gate control signal Gb and the fourth photo gate control signal Gd simultaneously to the array 22 under a control of the timing controller 26. For example, the photo gate controller 28 and the light source driver 30 may be synchronized with each other and operate.

The photo gate 110 may be embodied in transparent poly silicon. According to an example embodiment, the photo gate 110 may be embodied in Indium tin oxide or tin-doped indium oxide (ITO), Indium Zinc Oxide (IZO), or Zinc Oxide (ZnO). A reflected light signal RL is incident to the array 22 through a lens module 34. Here, the lens module 34 may include a lens and an infrared pass filter.

The depth sensor 10 may include a plurality of light sources arranged in a circle around the lens module 34; however, only one light source 32 is illustrated for convenience of explanation.

A light signal RL incident to the array 22 received through the lens module 34 may be modulated by a depth pixel 23-1.

The depth pixel 23-1 accumulates optical electrons or optical charges of an incident light signal RL during a desired (or, alternatively a predetermined time), e.g., an integration time, and outputs pixel signals $A_0'$, $A_1'$, $A_2'$ and $A_3'$ generated according to an accumulation result. Each pixel signal Ak' generated by the depth pixel 23-1 may be indicated as shown in equation 1.

$$Ak' = \sum_{n=1}^{N} a_{k \times n} \quad \text{[Equation 1]}$$

Here, when a signal input to the photo gate 110 of the depth pixel 23-1 is the first photo gate control signal Ga, k is 0, and when the signal is the third photo gate control signal Gc, k is 1. K is 2 when the signal input to the photo gate 110 of the depth pixel 23-1 is Gb, and k is 3 when the signal is the fourth photo gate control signal Gd.

$A_{k,n}$ is the number of optical electrons (or optical charges) detected in the depth pixel 23 when a $n^{th}$ gate signal (n is a natural number) is applied with a phase difference corresponding to k, and N=fm*Tint. Here, fm is a frequency of a modulated light signal EL, and Tint is integration time.

Under a control of the timing controller 26, a CDS/ADC circuit 36 performs a correlated double sampling (CDS) operation and an analog to digital converting (ADC) operation on each pixel signal ($A_0'$, $A_1'$, $A_2'$ and $A_3'$) detected from the depth pixel 23-1 and outputs each digital pixel signal ($A_0$, $A_1$, $A_2$, $A_3$).

The depth sensor 10 may further include active load circuits (not shown) for transmitting pixel signals output from a plurality of column lines embodied in the array 22 to the CDS/ADC circuit 36. A memory 38 receives and stores each digital pixel signal ($A_0$, $A_1$, $A_2$, $A_3$) output from the CDS/ADC circuit 36.

Hereinafter, each digital pixel signal ($A_0$, $A_1$, $A_2$, $A_3$) are each called a pixel signal for convenience of explanation.

Figure 4:
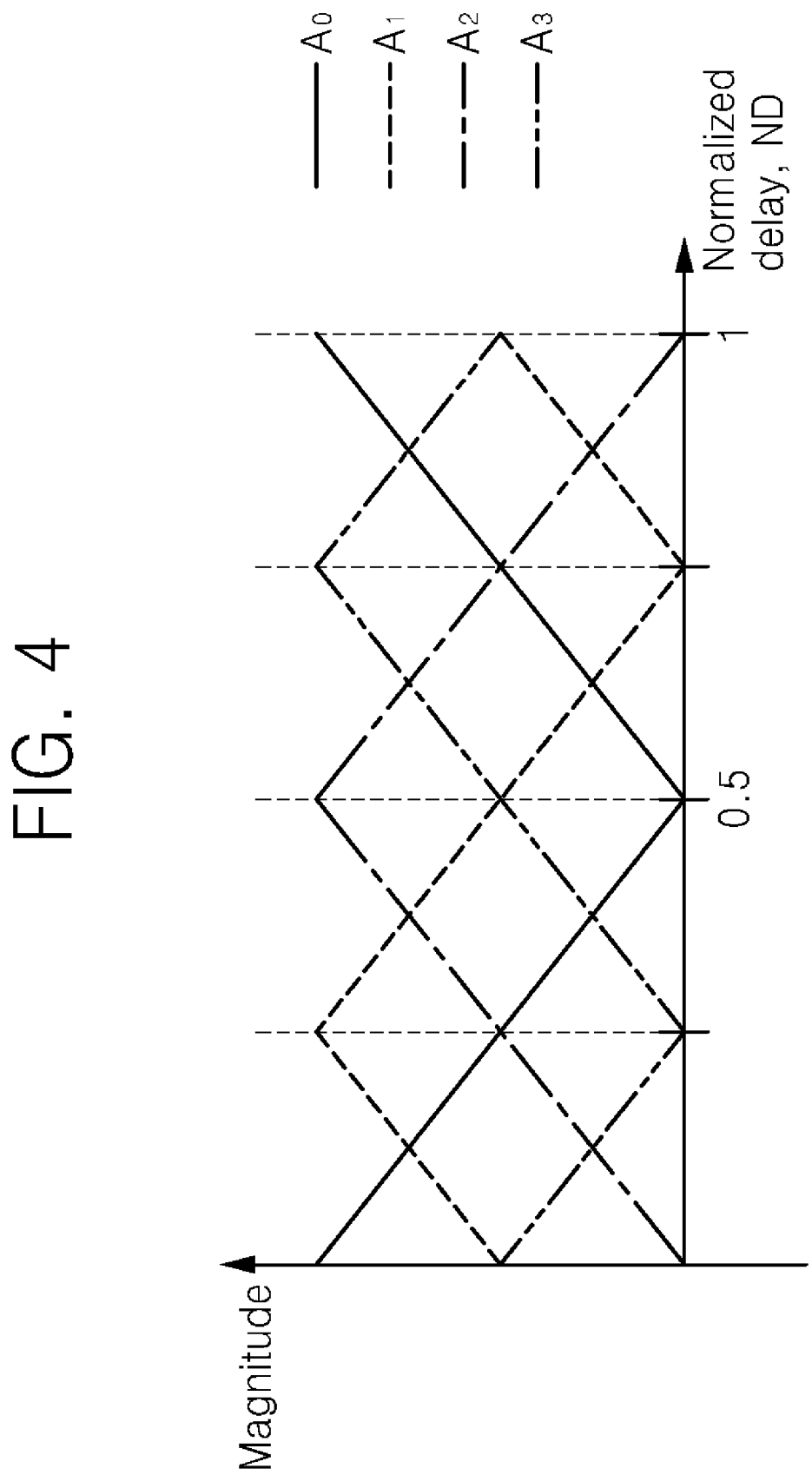
FIG. 4 is a graph of a plurality of pixel signals detected from the depth pixel illustrated in FIG. 1.

FIG. 4 is a graph of a plurality of pixel signals detected from the depth pixel illustrated in FIG. 1. Referring to FIGS. 1 to 4, a x axis of FIG. 4 indicates a normalized delay ND and a y axis indicates a normalized magnitude of each pixel signal ($A_0$, $A_1$, $A_2$, $A_3$). The normalized delay ND means that a phase shift θ between a modulated light signal EL and a reflected light signal RL is normalized to range from 0 to 1.

For example, when the normalized delay DL is 0, a phase of a reflected light RL and a phase of the first photo gate control signal Ga are the same in FIG. 3. Accordingly, a first pixel signal $A_0$ detected from the depth pixel 23-1 has a maximum value. In addition, a phase difference between the first photo gate control signal Ga and the second photo gate control signal Gb is 180°, so that a third pixel signal $A_2$ has a minimum value.

When the normalized delay DL is 0.5, a phase of a reflected light RL and a phase of the second photo gate control signal Gb are the same in FIG. 3. Accordingly, the third pixel signal $A_2$ detected from the depth pixel 23-1 has a maximum value and the first pixel signal $A_0$ has a minimum value.

According to a distance between a target object 40 and a depth sensor 10, normalized delay ND is changed. For example, as a distance between the target object 40 and the depth sensor 10 gets longer, the normalized delay ND gets closer to 1. Each pixel signal ($A_0$, $A_1$, $A_2$, $A_3$) has a form of a triangular wave.

Figure 5A:
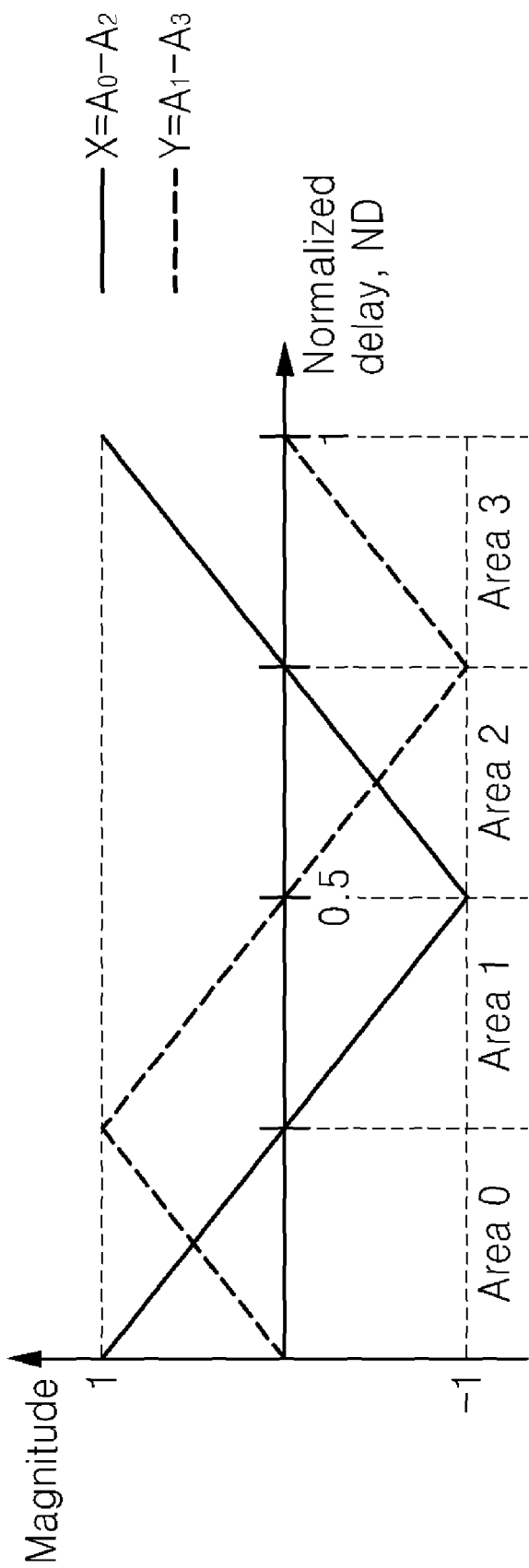
FIG. 5A is a graph illustrating a plurality of regions graphing the plurality of pixel signals detected from the depth pixel illustrated in FIG. 1.

FIG. 5A is a graph illustrating a plurality of regions graphing a plurality of pixel signals detected from the depth pixel illustrated in FIG. 1. Referring to FIGS. 4 and 5A, X is a signal where a third pixel signal $A_2$ is subtracted from a first pixel signal $A_0$ and Y is a signal where a fourth pixel signal $A_3$ is subtracted from a second pixel signal $A_1$.

A graph of FIG. 5A may be divided into a plurality of regions Area0 to Area3 according to whether X and Y are positive or negative. The plurality of regions Area0 to Area3 may be indicated as shown in Table 1.

TABLE 1

| | Area0 (0 ≤ ND < 0.25) | Area1 (0.25 ≤ ND < 0.5) | Area2 (0.5 ≤ ND < 0.75) | Area3 (0.75 ≤ ND < 1) |
|---|---|---|---|---|
| X | Positive | Negative | Negative | Positive |
| Y | Positive | Positive | Negative | Negative |

Figure 5B:
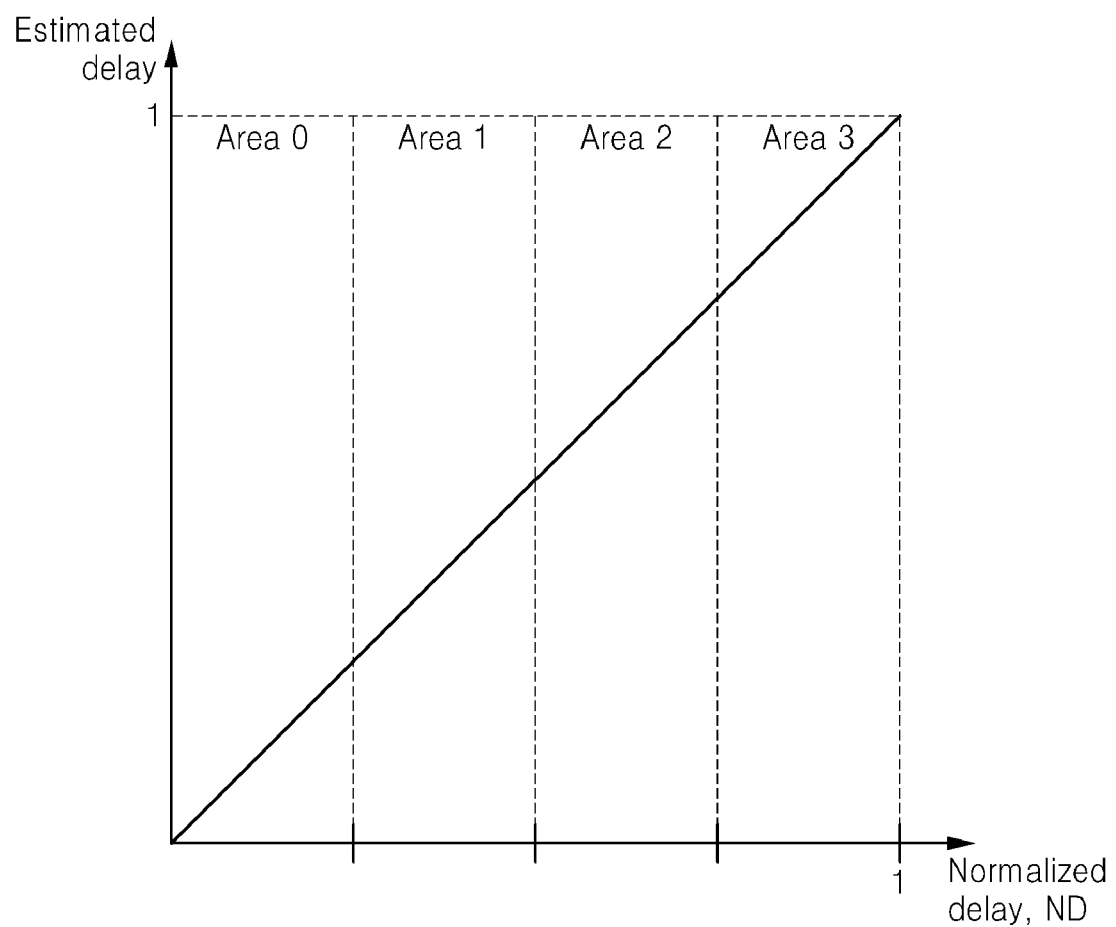
FIG. 5B is a graph for explaining a plurality of regions illustrated in FIG. 5A.

FIG. 5B is a graph for explaining the plurality of regions illustrated in FIG. 5A. A X axis indicates a normalized actual delay and a Y axis indicates a normalized estimated delay used to calculate a distance Z.

Referring to FIGS. 1 to 5B, the distance Z may be calculated as shown in equation 2.

$$Z = (aX + bY)/M \quad \text{[Equation 2]}$$

Here, Z is a distance, a and b are coefficients, M is a magnitude, X is a signal where a third pixel signal $A_2$ is subtracted from a first pixel signal $A_0$, and Y is a signal where a fourth pixel signal $A_3$ is subtracted from a second pixel signal $A_1$, where a, b, and M have different values according to each region Area0 to Area3 as defined in Table 2 below.

A value of M, a and b according to each region Area0 to Area3 may be indicated as shown in table 2.

TABLE 2

|   | Area0 | Area1 | Area2 | Area3 |
|---|---|---|---|---|
| M | $(A_0 - A_3 + A_1 - A_2)/2$ | $(A_1 - A_0 + A_2 - A_3)/2$ | $(A_2 - A_1 + A_3 - A_0)/2$ | $(A_3 - A_2 + A_0 - A_1)/2$ |
| a | 0 | -½ | -½ | 1 |
| b | ¼ | ¼ | -¾ | -¾ |

According to an example embodiment, a value of M, a, and b may be changed.

As shown in FIG. 4, each pixel signal ($A_0$, $A_1$, $A_2$, $A_3$) reaches a maximum value at a different phase, with pixel signals $A_0$ and $A_2$ reaching maximum values at opposite phases and $A_1$ and $A_3$ reaching maximum values at opposite phases. Using this fact, a microprocessor can calculate a distance Z using equation 2, shown above. Table 2 utilizes all four pixel signals ($A_0$, $A_1$, $A_2$, $A_3$) to calculate the magnitude M in each of areas Area0 to Area3. However, when one or more of the pixel signals ($A_0$, $A_1$, $A_2$, $A_3$) are saturated, the microprocessor may be unable to accurately calculate the distance Z using the values shown in Table 2. Instead, the microprocessor calculates the distance Z using non-saturated pixel signals as described below.

Figure 6:
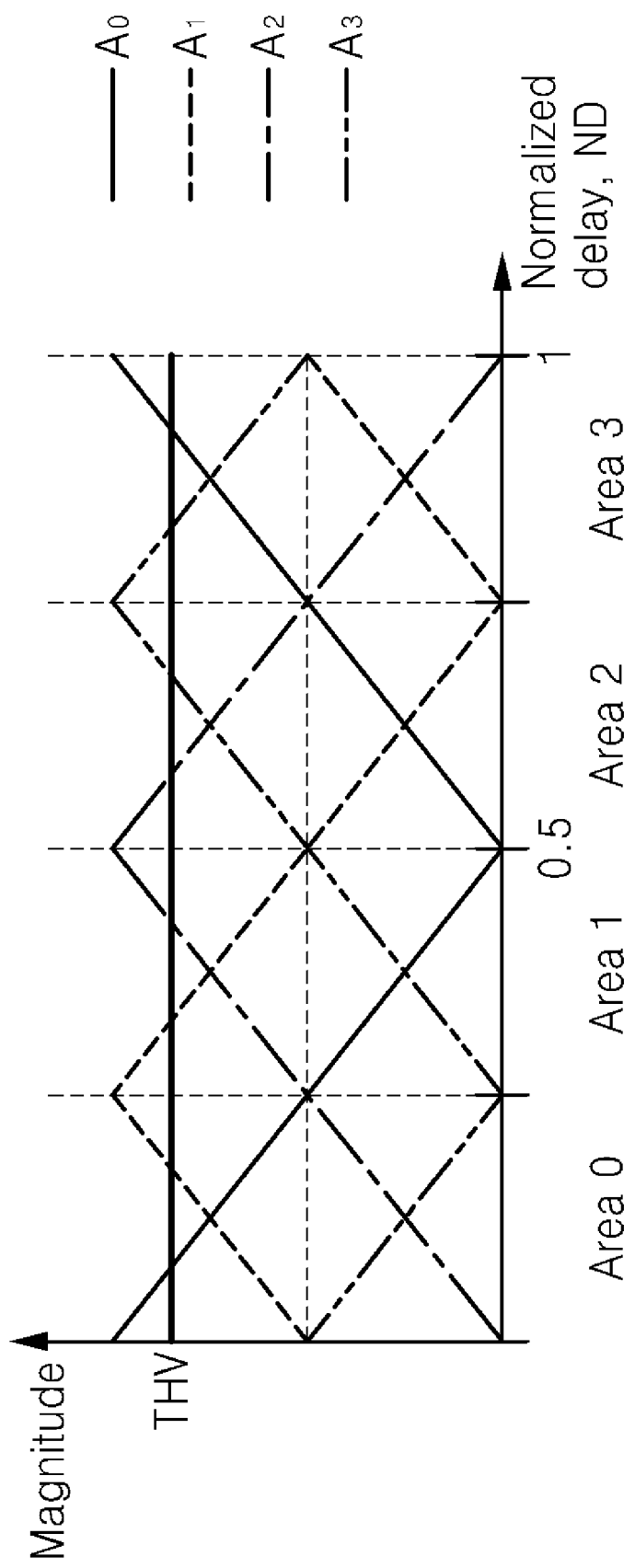
FIG. 6 is a graph of the plurality of pixel signals when one of the plurality of pixel signals detected from the depth pixel illustrated in FIG. 1 is saturated.

FIG. 6 is a graph of the plurality of pixel signals, illustrating one or more of a plurality of pixel signals detected from the depth pixel illustrated in FIG. 1 is saturated.

Referring to FIGS. 1 and 6, the microprocessor 39 compares a magnitude of each of the plurality of pixel signals ($A_0$, $A_1$, $A_2$, $A_3$) with a threshold value THV and determines whether each of the plurality of pixel signals ($A_0$, $A_1$, $A_2$, $A_3$) is saturated according to a comparison result.

The microprocessor 39 calculates depth Z to the target object 40 according to the determination results. That is, the microprocessor 39 calculates the depth Z by using the equation 2 and a following table 3.

TABLE 3

|   |   | Saturation | | | |
|---|---|---|---|---|---|
|   |   | $A_0"$ | $A_1"$ | $A_2"$ | $A_3"$ |
| X |   | $-2A_2 + A_1 + A_3$ | $A_0 - A_2$ | $2A_0 - A_1 - A_3$ | $A_0 - A_2$ |
| Y |   | $A_1 - A_3$ | $-2A_3 + A_0 + A_2$ | $A_1 - A_3$ | $2A_1 - A_0 - A_2$ |
| M | Area0 | $A_1 - A_2$ | $A_0 - A_3$ | — | — |
|   | Area1 | — | $A_2 - A_3$ | $A_2 - A_0$ | — |
|   | Area2 | — | — | $A_3 - A_0$ | $A_2 - A_1$ |
|   | Area3 | $A_3 - A_2$ | — | — | $A_0 - A_1$ |

$A_0"$, $A_1"$, $A_2"$ or $A_3"$ means a saturated signal in the table 3. For example, when a first pixel signal $A_0"$ is saturated, $X = -2A_2 + A_1 + A_3$ and $Y = A_1 - A_3$.

The microprocessor 39 determines whether a saturated signal $A_0"$ belongs to a first region Area0 or a fourth region Area3 according to X and Y.

When X and Y are both positive, the saturated signal $A_0"$ belongs to a first region Area0 and $M = A_1 - A_2$. When X is positive and Y is negative, the saturated signal $A_0"$ belongs to a fourth region Area3 and $M = A_3 - A_2$. As shown in FIG. 6, a signal $A_0$ is not saturated in a second region Area1 and a third region Area2.

The microprocessor 39 determines coefficients (a and b) according to a determined region and calculates M. The coefficients (a and b) are as shown in table 2. Accordingly, even if one of the plurality of pixel signals ($A_0$, $A_1$, $A_2$, $A_3$) is saturated, the microprocessor 39 may calculate a distance Z by using the equation 2 and the table 3.

Figure 7:
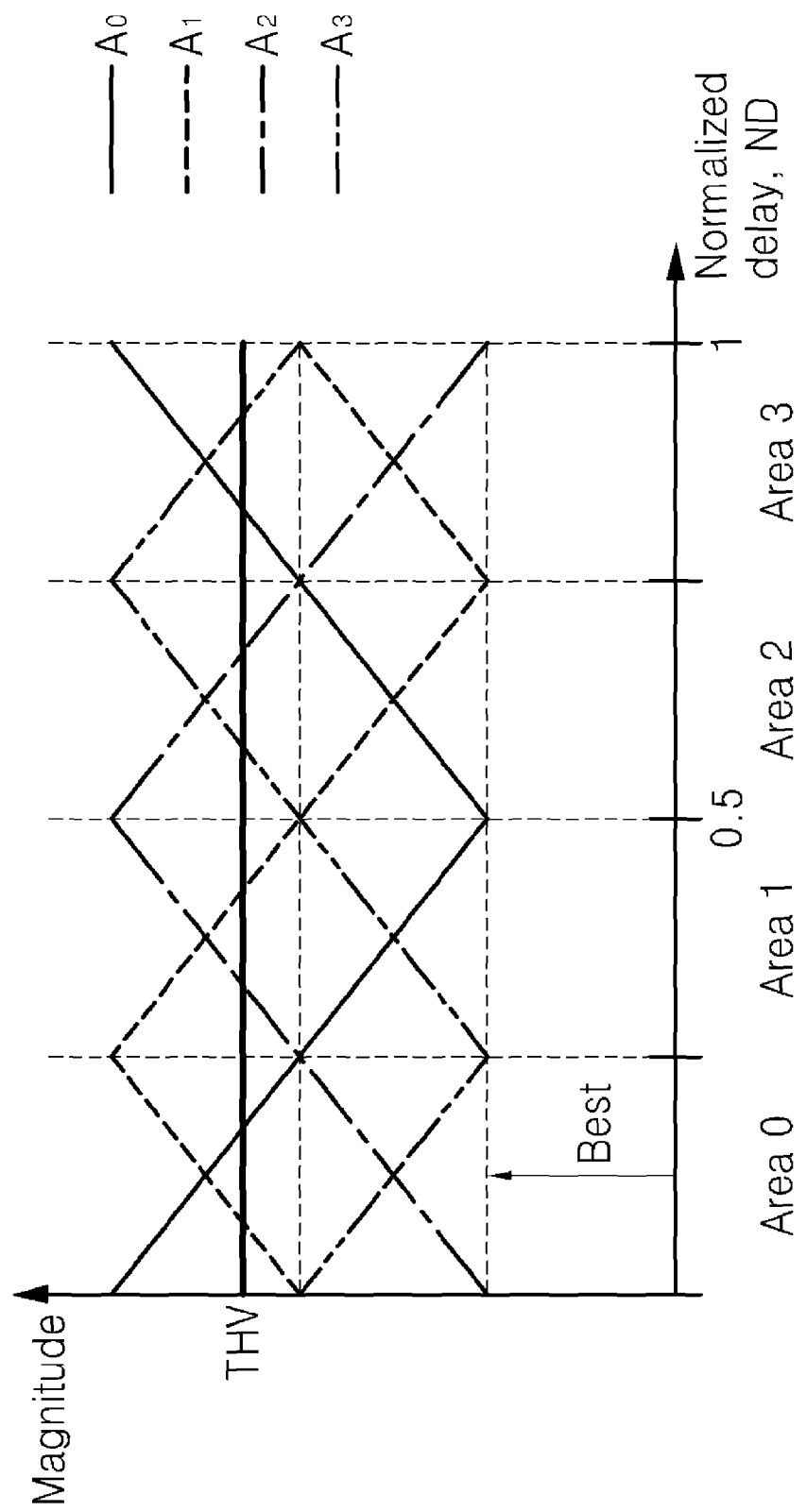
FIG. 7 is a graph of the plurality of pixel signals when two of the plurality of pixel signals detected from the depth pixel illustrated in FIG. 1 are saturated.

FIG. 7 is, when two of the plurality of pixel signals, which are detected from the depth pixel illustrated in FIG. 1, are saturated, a graph of the plurality of pixel signals. Referring to FIGS. 1 and 7, the microprocessor 39 compares each magnitude of the plurality of pixel signals ($A_0$, $A_1$, $A_2$, $A_3$) with a threshold value THV and determines whether each of the plurality of pixel signals ($A_0$, $A_1$, $A_2$, $A_3$) is saturated according to a comparison result.

When the microprocessor 39 determines that two of the plurality of pixel signals ($A_0$, $A_1$, $A_2$, $A_3$) are saturated, it estimates an ambient light signal Best emitted from the ambient light source 41 by using a plurality of neighboring pixel signals ($A_{00}$, $A_{10}$, $A_{20}$ and $A_{30}$) detected from a neighboring depth pixel 23-2. The ambient light signal Best may be summarized as shown in table 4.

TABLE 4

| | Area0 | Area1 | Area2 | Area3 |
|---|---|---|---|---|
| Best | $(3A_{20} + A_{30}) - A_{00} - A_{10})/4$ | $(3A_{30} + A_{00}) - A_{10} - A_{20})/4$ | $(3(A_{00} + A_{10}) - A_{20} - A_{30})/4$ | $(3(A_{10} + A_{20}) - A_{30} - A_{00})/4$ |

The plurality of neighboring pixel signals ($A_{00}$, $A_{10}$, $A_{20}$ and $A_{30}$) are all non-saturated signals. For example, when the plurality of neighboring pixel signals ($A_{00}$, $A_{10}$, $A_{20}$ and $A_{30}$) belong to a first region Area0, the ambient light signal Best is as shown in equation 4.

$$\text{Best} = (3(A_{20} + A_{30}) - A_{00} - A_{10})/4 \quad \text{[Equation 4]}$$

According to an example embodiment, when the microprocessor 39 determines that two of the plurality of pixel signals ($A_0$, $A_1$, $A_2$, $A_3$) are saturated, it may estimate an ambient light signal Best emitted from the ambient light source 41 by using a plurality of neighboring pixel signals ($A_{01}$, $A_{11}$, $A_{21}$ and $A_{31}$) detected from a neighboring depth pixel 23-3. The ambient light signal Best may be summarized as shown in table 5.

TABLE 5

| | Area0 | Area1 | Area2 | Area3 |
|---|---|---|---|---|
| Best | When $A_{01}"$ is saturated, | When $A_{11}"$ is saturated, | When $A_{21}"$ is saturated, | When $A_{31}"$ is saturated, |

TABLE 5-continued

| Area0 | Area1 | Area2 | Area3 |
|---|---|---|---|
| $(A_{11}+A_{31})/2 - (A_{11}-A_{21})$ When $A_{11}"$ is saturated, $(A_{01}+A_{21})/2 - (A_{01}-A_{31})$ | $(A_{21}+A_{01})/2 - (A_{21}-A_{31})$ When $A_{21}"$ is saturated, $(A_{11}+A_{31})/2 - (A_{11}-A_{01})$ | $(A_{31}+A_{11})/2 - (A_{31}-A_{01})$ When $A_{31}"$ is saturated, $(A_{21}+A_{01})/2 - (A_{21}-A_{11})$ | $(A_{01}+A_{21})/2 - (A_{01}-A_{11})$ When $A_{01}"$ is saturated, $(A_{31}+A_{11})/2 - (A_{31}-A_{21})$ |

One of the plurality of neighboring pixel signals ($A_{01}$, $A_{11}$, $A_{21}$ and $A_{31}$) is a saturated signal. $A_{01}"$, $A_{11}"$, $A_{21}"$ or $A_{31}"$ means a saturated signal. For example, when a neighboring pixel signal $A_{01}"$ is saturated, the ambient light signal Best may be calculated as shown in equation 5.

$$Best = (A_{11}+A_{31})/2 - (A_{11}-A_{21})$$ [Equation 5]

According to another example embodiment, the ambient light signal Best may be an average value of each ambient light signal estimated by at least two neighboring pixels, e.g., 23-2 and 23-3.

A neighboring depth pixel (e.g., 23-2 or 23-3), alike the depth pixel 23-1, accumulates an incident light signal RL and optical electrons (or optical charges) of the ambient light signal Best during a desired (or, alternatively a predetermined time), e.g., an integration time, and outputs neighboring pixel signals ($A_{00}$, $A_{10}$, $A_{20}$ and $A_{30}$) generated according to an accumulation result.

The microprocessor 39 may calculate M according to a plurality of areas Area0 to Area3 and calculates X and Y according to a calculated M. X, Y and M may be summarized as shown in table 6.

TABLE 6

| | | Saturation | | | |
|---|---|---|---|---|---|
| | | $A_0"$, $A_1"$ | $A_1"$, $A_2"$ | $A_2"$, $A_3"$ | $A_3"$, $A_0"$ |
| X | | $A_3 - A_2 + M$ | $A_0 - A_3 + M$ | $-A_1 + A_0 + M$ | $-A_2 - A_1 + 3M$ |
| Y | | $A_2 - A_3 + M$ | $-A_3 - A_0 + 3M$ | $-A_0 + A_1 + M$ | $A_1 - A_2 - M$ |
| M | Area0 | $A_2 + A_3 - 2Best$ | — | — | — |
| | Area1 | — | $A_0 + A_3 - 2Best$ | — | — |
| | Area2 | — | — | $(A_0 + A_1 - 2Best)$ | — |
| | Area3 | — | — | — | $A_1 + A_2 - 2Best$ |

$A_0"$, $A_1"$, $A_2"$ or $A_3"$ means a saturated signal in the table 6. For example, when two pixel signals (A0" and A1") are saturated, $X=A3-A2+M$ and $Y=A2-A3+M$. The M may be calculated from the ambient light signal Best.

Moreover, a region where two pixel signals. $A_0"$ and $A_1"$ are saturated is a first region Area0. Two pixel signals ($A_0$ and $A_1$) are not saturated in a second region Area1, a third region Area2 and a fourth region Area3. Accordingly, even if two signals among the plurality of pixel signals ($A_0$, $A_1$, $A_2$, $A_3$) are saturated, the microprocessor 39 may calculate a distance Z by using the equation 2 and the table 6. Coefficients (a and b) are as shown in table 2.

Figure 8:
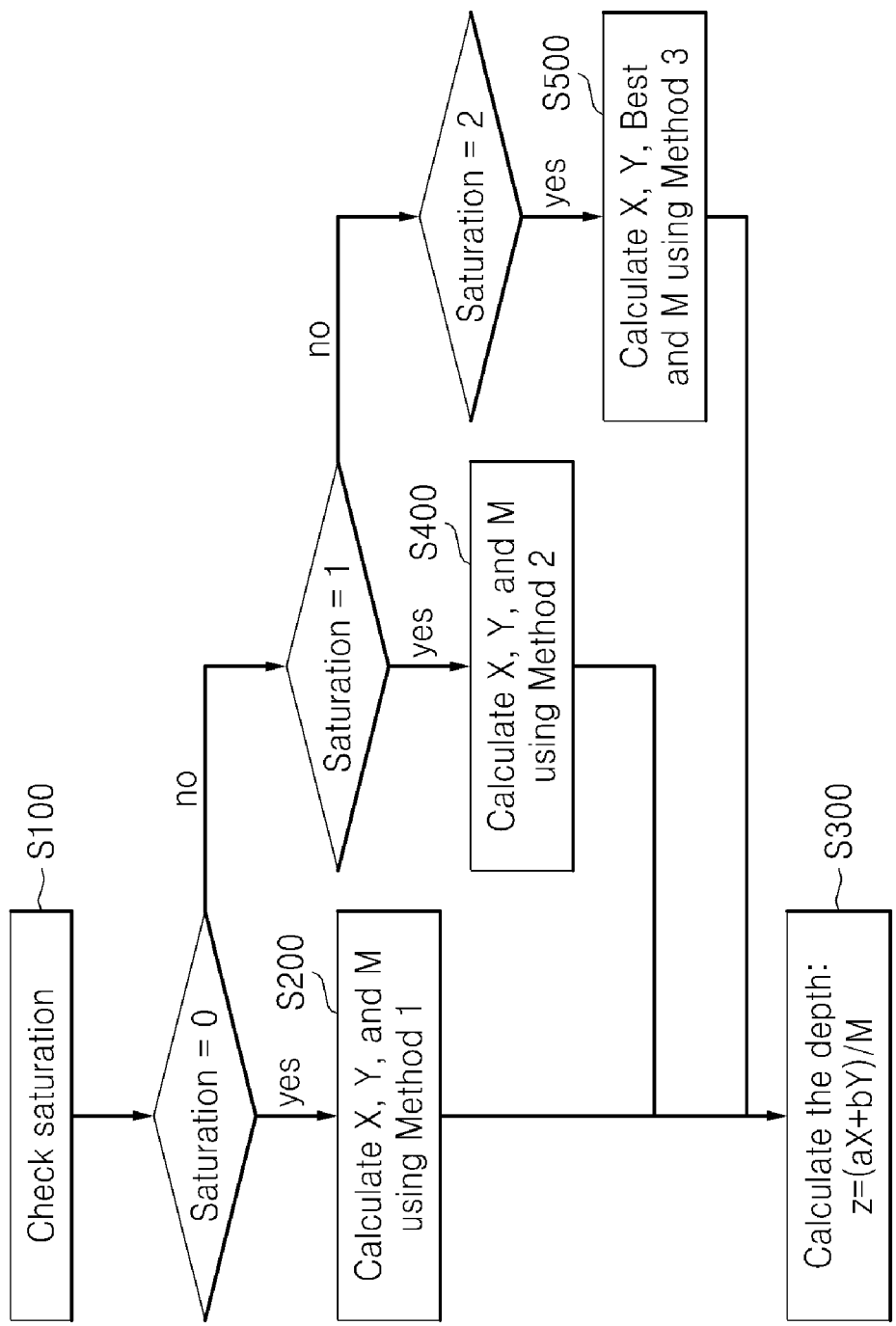
FIG. 8 is a flowchart for explaining a depth calculation method of the depth sensor illustrated in FIG. 1.

FIG. 8 is a flowchart for explaining a depth calculation method of the depth sensor illustrated in FIG. 1. Referring to FIGS. 1 to 8, the microprocessor 39 compares each magnitude of the plurality of pixel signals A0 to A3 detected from the depth pixel 23 with a threshold value and determines whether each of the plurality of pixel signals ($A_0$ to $A_3$) is saturated according to a comparison result (S100).

When all of the plurality of pixel signals A0 to A3 are not saturated, the microprocessor 39 calculates X, Y and M by using a first method (S200).

Figure 9:
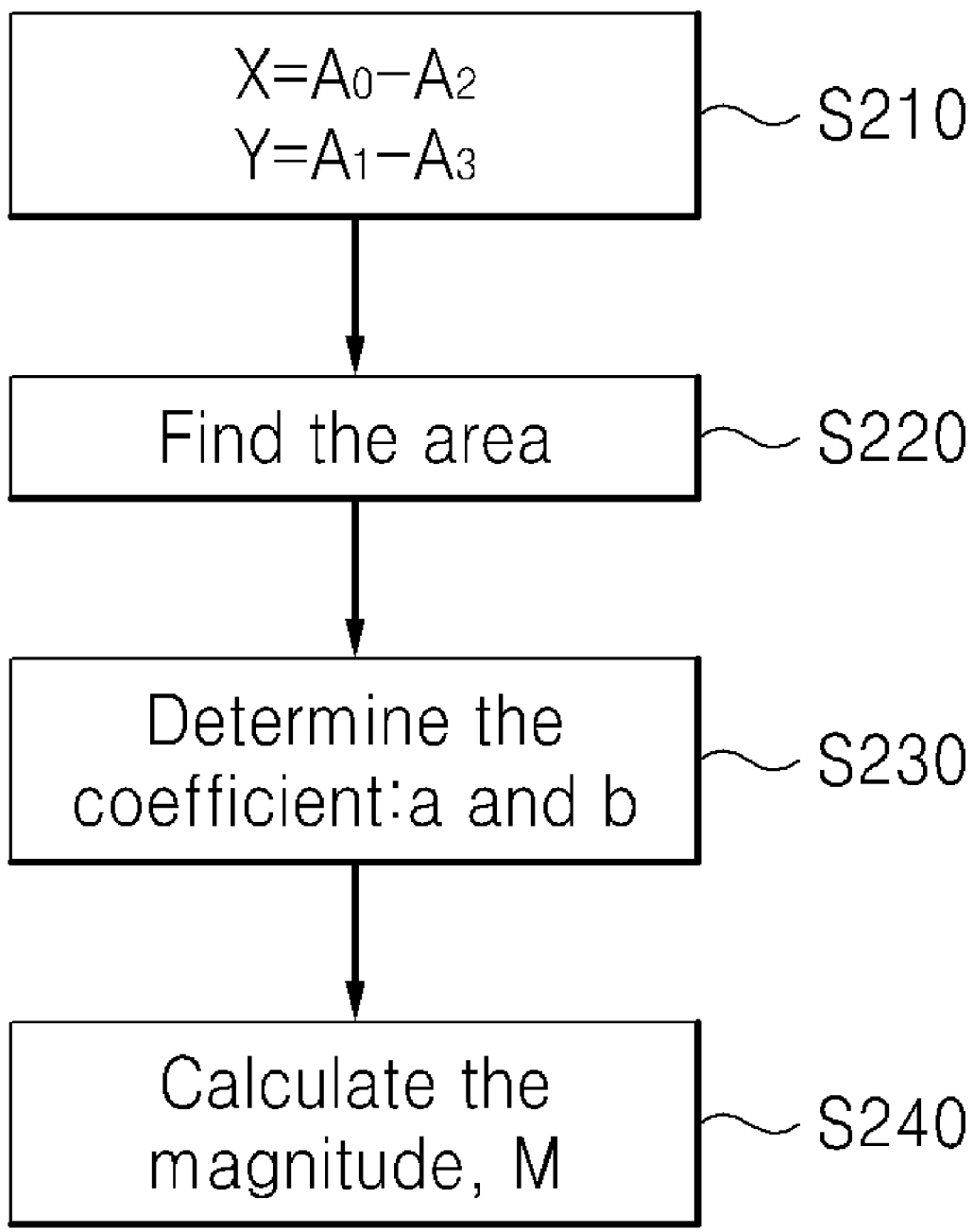
FIG. 9 is a flowchart for explaining a depth calculation method according to a first method illustrated in FIG. 8.

FIG. 9 is a flowchart for explaining a depth calculation method according to the first method (S200) illustrated in FIG. 8. Referring to FIGS. 1 to 9, the microprocessor 39 calculates X by subtracting a third pixel signal A2 from a first pixel signal $A_0$ and calculates Y by subtracting a fourth pixel signal $A_3$ from a second pixel signal A1 (S210).

The microprocessor 39 determines which one of the plurality of regions (Area0 to Area3) according to whether X and Y are positive or negative (S220). For example, when X and Y are both positive, the microprocessor 39 determines a first region Area0 ($0 \leq ND < 0.25$). That is, a normalized delay ND between a modulated light signal EL and a reflected light signal RL is between 0 and 0.25.

The microprocessor 39 determines coefficients (a and b) according to the determined region (S230). The microprocessor 39 calculates a magnitude M according to the determined region (S240). The microprocessor 39 calculates a depth Z according to the equation 2(S300).

Referring to FIG. 8, when one of the plurality of pixel signals ($A_0$ to $A_3$) is saturated, the microprocessor 39 calculates X, Y and M by using a second method (S500).

Figure 10:
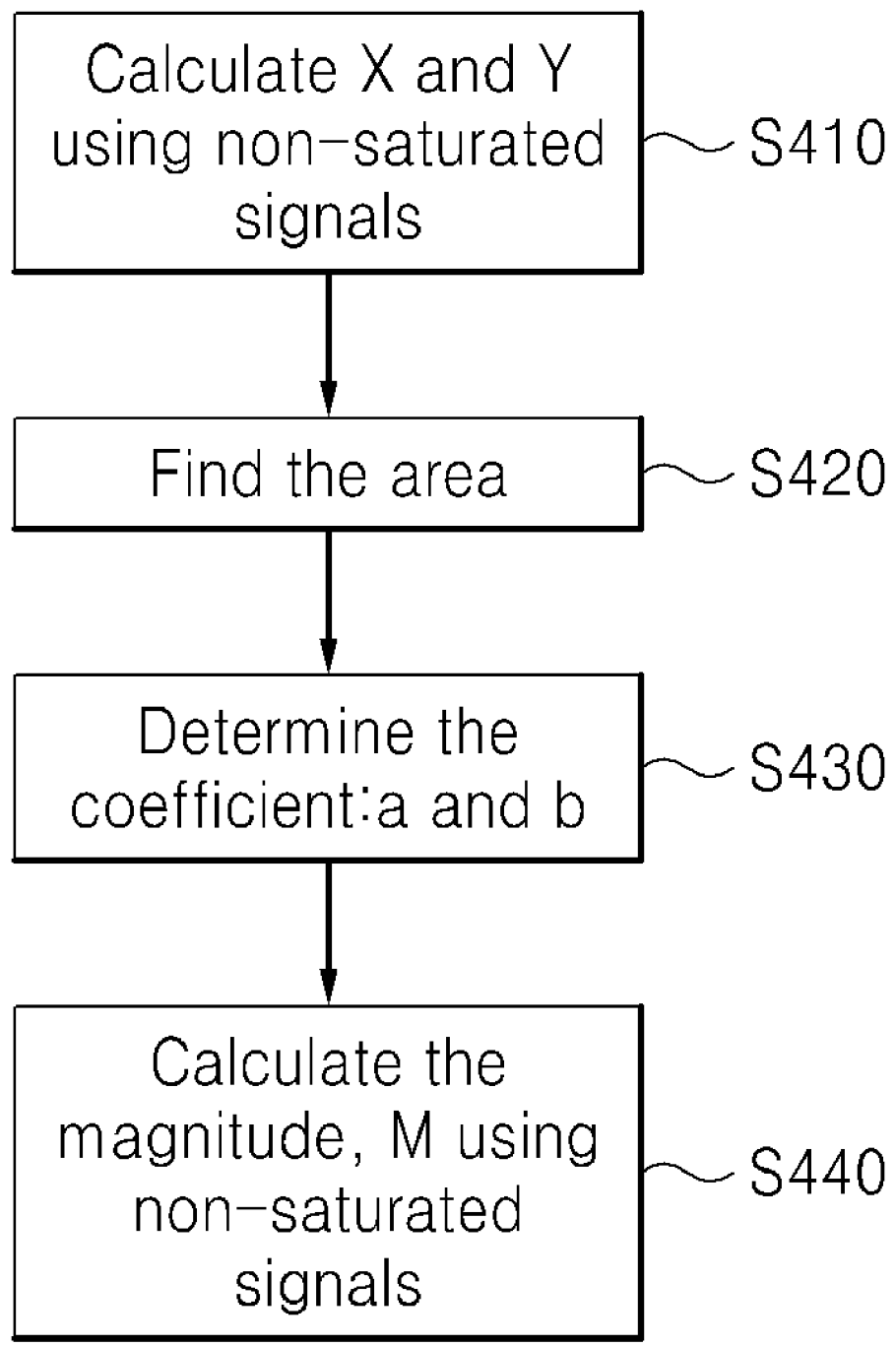
FIG. 10 is a flowchart for explaining a depth calculation method according to a second method illustrated in FIG. 8.
Figure 11:
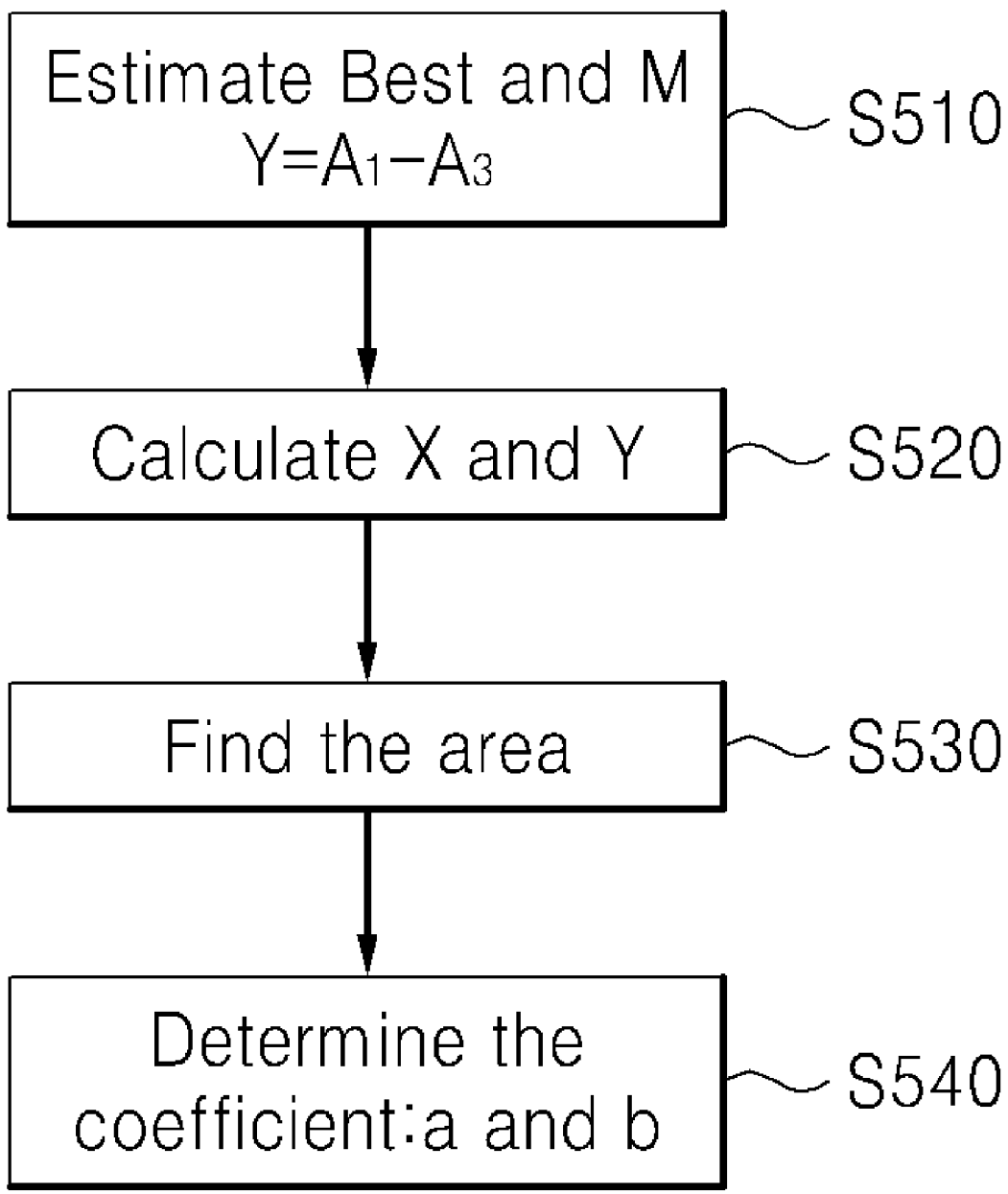
FIG. 11 is a flowchart for explaining a depth calculation method according to a third method illustrated in FIG. 8.

FIG. 10 is a flowchart for explaining a depth calculation method according to the second method illustrated in FIG. 8. Referring to FIGS. 1 to 8 and 10, the microprocessor 39 calculates X and Y by using non-saturated pixel signals (S410). For example, when a first pixel signal $A_0"$ is saturated, $X=-2A_2+A_1+A_3$ and $Y=A_1-A_3$.

The microprocessor 39 finds one of the plurality of regions (Area0 to Area3) according to whether X and Y are positive or negative (S420). The microprocessor 39 determines coefficients (a and b) according to the determined region (S430). The microprocessor 39 calculates a magnitude M according to the determined region (S440). The microprocessor 39 calculates depth Z according to the equation 2(S300).

Referring to FIG. 8, when two of the plurality of pixel signals ($A_0$ to $A_3$) are saturated, the microprocessor 39 calculates X,Y and M by using a third method (S400). Referring to FIGS. 1 to 8 and 11, FIG. 11 is a flowchart for explaining a depth calculation method according to the third method illustrated in FIG. 8. When two of the plurality of pixel signals ($A_0$ to $A_3$) are saturated, the microprocessor 39 estimates an ambient light signal Best by using neighboring pixel 23-2 or 23-3 and calculates a magnitude M (S510).

The microprocessor 39 calculates X and Y (S520). For example, when two pixel signals $A_0''$ and $A_1''$ are saturated, $X=A_3-A_2+M$ and $Y=A_2-A_3+M$. The microprocessor 39 finds one of the plurality of regions (Area0 to Area3) according to whether X and Y are positive or negative (S530). The microprocessor 39 determines coefficients (a and b) according to the determined region (S540). The microprocessor 39 calculates depth Z according to the equation 2(S300).

Figure 12:
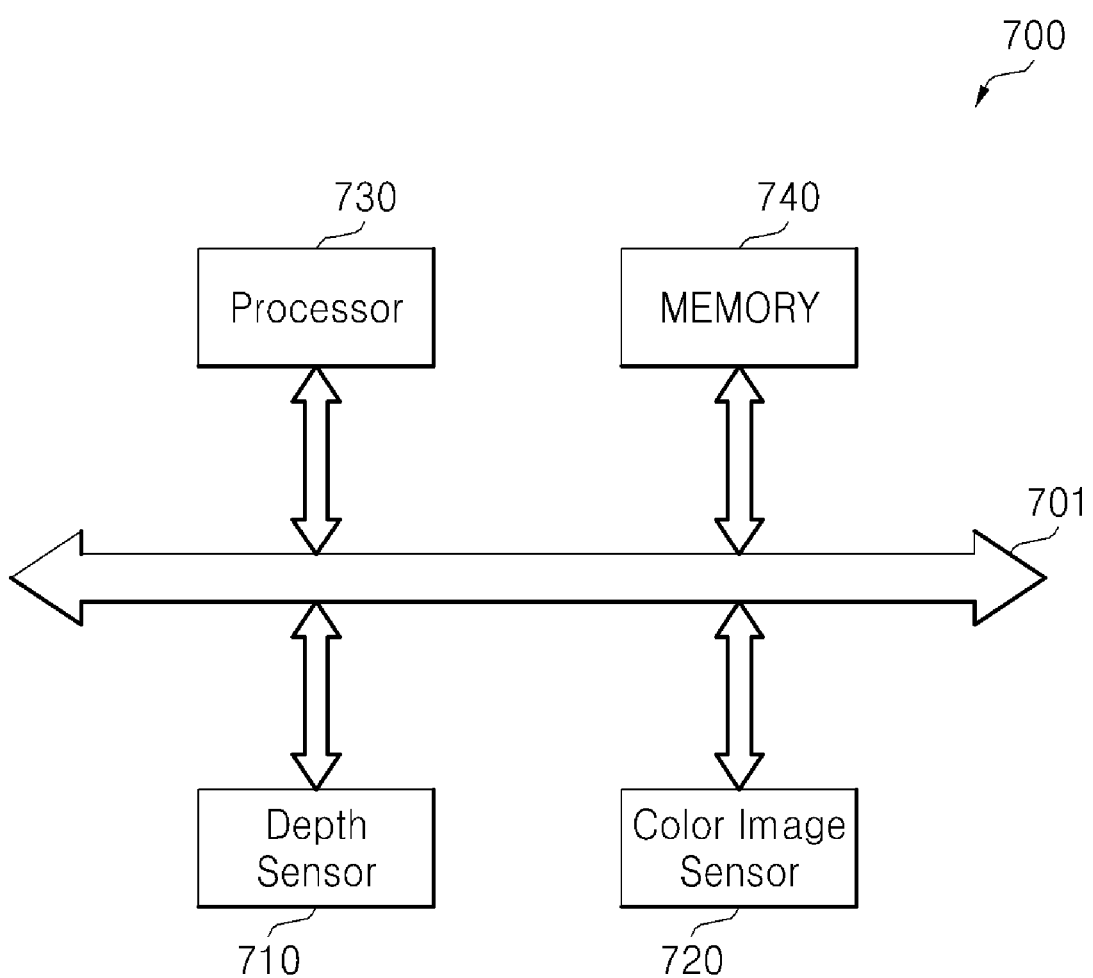
FIG. 12 is a block diagram of an image processing system including a color image sensor and a depth sensor according to an example embodiment of the present inventive concepts.

FIG. 12 is a block diagram of an image processing system including a color image sensor and a depth sensor according to an example embodiment of the present inventive concepts. Referring to FIG. 12, an image processing system 700 may include a depth sensor 710, a color image sensor 720 including RGB color pixels, and a processor 730.

FIG. 12 illustrates the depth sensor 710 and the color image sensor 720, which are physically separated from each other, for convenience of explanation; however, the depth sensor 710 and the color image sensor 720 may include signal processing circuits which are physically shared. Here, the depth sensor 710 indicates the depth sensor 10 illustrated in FIG. 1

The color image sensor 720 may mean an image sensor including a pixel array embodied in a red pixel, a green pixel and a blue pixel without including a depth pixel. Accordingly, the processor 730 may generate three dimensional image information based on depth (or distance) calculated by the depth sensor 710 and each color information (at least one of red information, green information, blue information, magenta information, cyan information and yellow information) output from the color image sensor 720, and display generated three dimensional image information through a display (not shown).

According to an example embodiment, the depth sensor 710 and the color image sensor 720 may be embodied in one sensor. In addition, the processor 730 may calculate depth based on a plurality of pixel signals output from the depth sensor 710 according to an example embodiment.

Three dimensional image information generated by the processor 730 may be stored in a memory device 740 through a bus 701.

The image processing system 700 may be used in a three dimensional distance measurer, a game controller, a depth camera or a gesture sensing apparatus.

A depth sensor according to an example embodiment of the present inventive concepts may calculate depth accurately even though at least one of a plurality of pixel signals is saturated.

While example embodiments have been particularly shown and described with reference to embodiments thereof, it will be understood by those of ordinary skill in the art that various changes in forms and details may be made therein without departing from the spirit and scope as defined by the following claims.

What is claimed is:

1. A method of calculating depth using a depth sensor comprising:
   outputting a modulated light to a target object;
   detecting four pixel signals ($A_0$, $A_1$, $A_2$, $A_3$) from a depth pixel based on a reflected light reflected by the target object during an integration time;
   determining whether each of the four pixel signals is a saturated pixel signal based on a magnitude of each of the four pixel signals ($A_0$, $A_1$, $A_2$, $A_3$) and a threshold value of the magnitude; and
   calculating a depth (Z) to the target object based on the determination results wherein,
   the depth Z is a function of real numbers X, Y and M, each of the X and the Y is related to at least two pixel signals among the four pixel signals ($A_0$, $A_1$, $A_2$, $A_3$),
   M is a function of the four pixel signals ($A_0$, $A_1$, $A_2$, $A_3$) such that M is a different function in a region defined according to a normalized delay ND, and
   the normalized delay ND indicates that a phase shift of the modulated light and the reflected light is normalized to range from 0 to 1.

2. The method of claim 1, wherein the calculating the depth (Z) uses at least one non-saturated pixel signal among the four pixel signals.

3. The method of claim 1, wherein the calculating the depth (Z) is calculated based on Z=(aX+bY)/M, and the a, b, X, Y and M are real numbers.

4. The method of claim 3, wherein $X=A_0-A_2$, the $Y=A_1-A_3$ and the M is
   $(A_0-A_3+A_1-A_2)/2$ when the normalized delay ND is greater than or equal to 0 and less than 0.25 ($0 \leq ND < 0.25$),
   $(A_1-A_0+A_2-A_3)/2$ when the normalized delay ND is greater than or equal to 0.25 and less than 0.5 ($0.25 \leq ND < 0.5$),
   $(A_2-A_1+A_3-A_0)/2$ when the normalized delay ND is greater than or equal to 0.5 and less than 0.75 ($0.5 \leq ND < 0.75$), and
   $(A_3-A_2+A_0-A_1)/2$ when the normalized delay ND is greater than or equal to 0.75 and less than 1 ($0.75 \leq ND < 1$).

5. The method of claim 3, wherein when the $A_0$ is a saturated pixel signal,
   the $X=-2A_2+A_1+A_3$, the $Y=A_1-A_3$, and
   the M is $A_1-A_2$ when the normalized delay ND is greater than or equal to 0 and less than 0.25 ($0 \leq ND < 0.25$) and the M is $A_3-A_2$ when the normalized delay ND is greater than or equal to 0.75 and less than 1 ($0.75 \leq ND < 1$).

6. The method of claim 3, wherein when the $A_1$ is a saturated pixel signal,
   the $X=A_0-A_2$, the $Y=-2A_3+A_0+A_2$, and
   the M is $A_0-A_3$ when the normalized delay ND is greater than or equal to 0 and less than 0.25 ($0 \leq ND < 0.25$) and the M is $A_2-A_3$ when the normalized delay ND is greater than or equal to 0.25 and less than 0.5 ($0.25 \leq ND < 0.5$).

7. The method of claim 3, wherein when the $A_2$ is saturated pixel signal,
   the $X=2A_0-A_1-A_3$, the $Y=A_1-A_3$, and
   the M is $A_1-A_0$ when the normalized delay ND is greater than or equal to 0.25 and less than 0.5 ($0.25 \leq ND < 0.5$) and the M is $A_3-A_0$ when the normalized delay ND is greater than or equal to 0.5 and less than 0.75 ($0.5 \leq ND < 0.75$).

8. The method of claim 3, wherein when the $A_3$ is saturated pixel signal,
   the $X=A_0-A_2$, the $Y=2A_1-A_0-A_2$, and
   the M is $A_2-A_1$ when the normalized delay ND is greater than or equal to 0.5 and less than 0.75 ($0.5 \leq ND < 0.75$) and the M is $A_0-A_1$ when the normalized delay ND is greater than or equal to 0.75 and less than 1 ($0.75 \leq ND < 1$).

9. The method of claim 3, wherein the calculating the depth (Z), when two of the four pixel signal ($A_0$, $A_1$, $A_2$, $A_3$) are saturated, further includes estimating an ambient light signal (Best) emitted from an ambient light source by using a plurality of neighboring pixel signals ($A_{00}$, $A_{10}$, $A_{20}$, $A_{30}$) detected from a neighboring depth pixel.

10. The method of claim 9, wherein the $M=A_2+A_3-2Best$, the $X=A_3-A_2+M$, and the $Y=A_2-A_3+M$, if the $A_0$ and the $A_1$ are saturated pixel signals.

11. The method of claim 9, wherein the $M=A_0+A_3-2Best$, the $X=A_0-A_3-M$, and the $Y=-A_3+A_0+M$, if the $A_1$ and the $A_2$ are saturated pixel signals.

12. The method of claim 9, wherein the $M=A_0+A_1-2Best$, the $X=-A_1+A_0-M$, and the $Y=-A_0+A_1-M$, if the $A_2$ and the $A_3$ are saturated pixel signals.

13. The method of claim 9, wherein the $M=A_1+A_2-2Best$, the $X=-A_2+A_1+M$, and the $Y=A_1-A_2-M$, if the $A_3$ and the $A_0$ are saturated pixel signals.

14. A depth sensor comprising:
a light source configured to output a modulated light to a target object;
a depth pixel configured to detect four pixel signals based on a reflected light reflected by the target object during an integration time; and
a microprocessor configured to,
determine whether each of the four pixel signals is a saturated pixel signal based on a magnitude of each of the four pixel signals and a threshold value of the magnitude, and
calculate a depth to the target object based on the determination results wherein
the depth is a function of real numbers X, Y and M,
each of the X and the Y is related to at least two pixel signals among the four pixel signals,
M is a function of the four pixel signals such that M is a different function in a region defined according to a normalized delay ND, and
the normalized delay ND indicates that a phase shift of the modulated light and the reflected light is normalized to range from 0 to 1.

15. The depth sensor of claim 14, wherein the microprocessor calculates the depth by using at least one non-saturated pixel signal among the four pixel signals.

16. A method of calculating distance using a depth sensor having at least one depth pixel, each depth pixel configured to generate a plurality of pixel signals corresponding to an amount of accumulated light and output a corresponding one of the plurality of pixel signals based on a corresponding photo gate control signal, the method comprising:
determining if any of the pixel signals are saturated, each of the pixel signals being generated during an integration time; and
calculating a distance to the target object using only non-saturated ones of the pixel signals generated during the integration time wherein,
the distance is a function of real numbers X, Y and M,
each of the X and the Y is related to at least two pixel signals among the plurality of pixel signals,
M is a function of the plurality of pixel signals such that M is a different function in a region defined according to a normalized delay ND, and
the normalized delay ND indicates that a phase shift of modulated light and reflected light is normalized to range from 0 to 1.

17. The method of claim 16, wherein the calculating the distance uses coefficients and variables that vary depending upon a number of pixel signals that are determined to be saturated.

18. The method of claim 16, wherein the calculating the distance comprises:
calculating a sum of a first variable multiplied by a first coefficient and a second variable multiplied by a second coefficient; and
dividing the sum by a magnitude, wherein at least one of the first variable, the second variable, the first coefficient, the second coefficient and the magnitude vary depending upon a number of pixel signals that are determined to be saturated.

* * * * *